Aug. 12, 1930. C. H. SPENCER Re. 17,770

METHOD OF BUILDING STORAGE RESERVOIRS IN DESERT COUNTRIES

Original Filed July 5, 1924 3 Sheets-Sheet 1

INVENTOR.
C. H. Spencer
BY B. J. Craig
ATTORNEY.

METHOD OF BUILDING STORAGE RESERVOIRS IN DESERT COUNTRIES

Original Filed July 5, 1924 3 Sheets-Sheet 2

Aug. 12, 1930. C. H. SPENCER Re. 17,770
METHOD OF BUILDING STORAGE RESERVOIRS IN DESERT COUNTRIES
Original Filed July 5, 1924 3 Sheets-Sheet 3
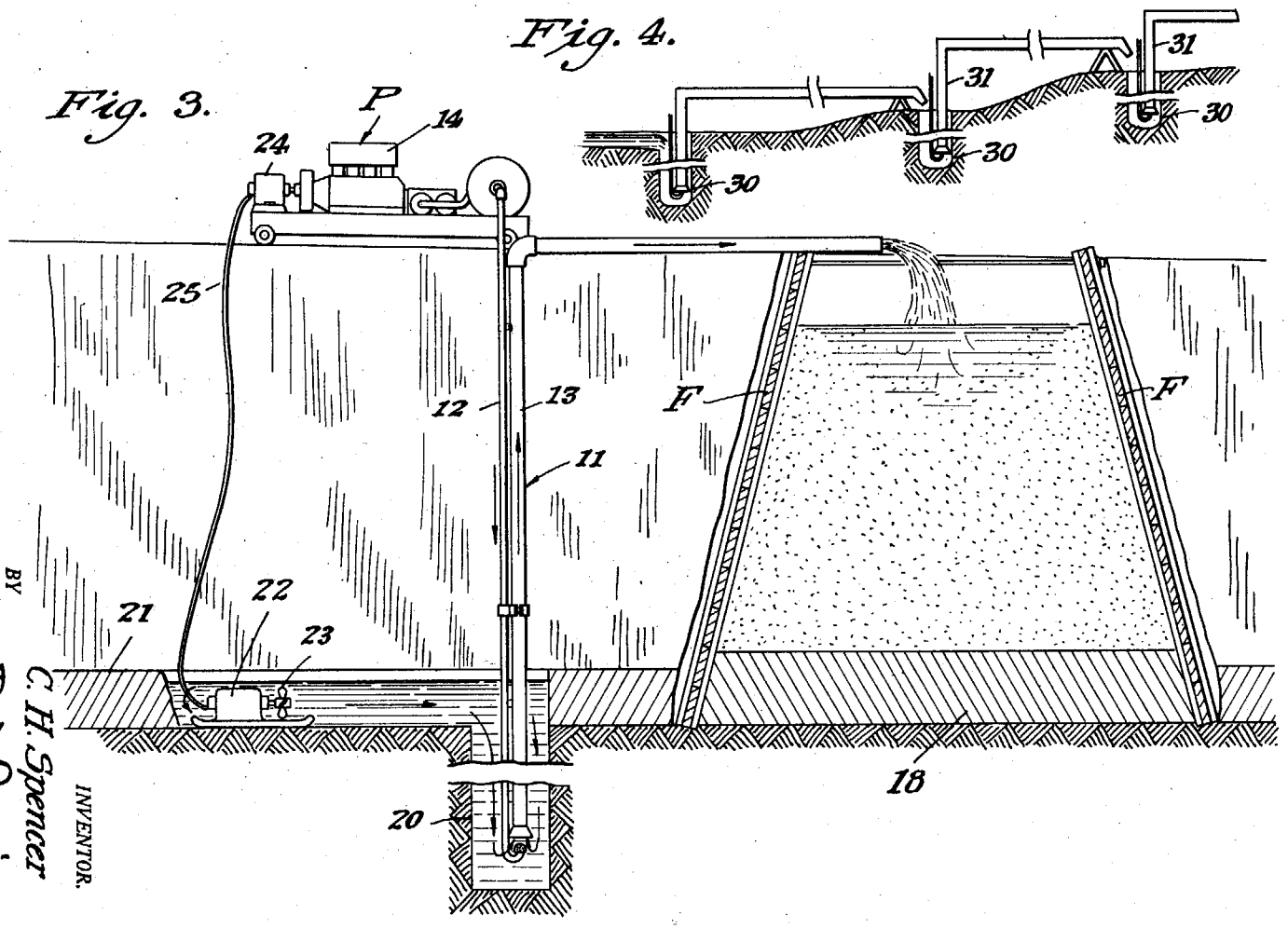
INVENTOR.
C. H. Spencer
BY
B. J. Craig
ATTORNEY.

Reissued Aug. 12, 1930 Re. 17,770

UNITED STATES PATENT OFFICE

CHARLES H. SPENCER, OF LOS ANGELES, CALIFORNIA

METHOD OF BUILDING STORAGE RESERVOIRS IN DESERT COUNTRIES

Original No. 1,640,099, dated August 23, 1927, Serial No. 724,435, filed July 5, 1924. Application for reissue filed March 19, 1929. Serial No. 348,332.

This invention relates to improvements in earth fill dams, and the method of constructing the same.

This method has to do primarily with the construction of earth fill dams of the gravity type, situated in such advantageous locations that they may impound a considerable quantity of water behind artificial or natural walls, and into which locations there is a considerable drainage or run-off area. The construction of these dams is, therefore, primarily for the purpose of forming reservoirs, into which water will naturally flow and accumulate at or after times of precipitation. and from which such water may be drawn by artificial or natural means for beneficial use (in the immediate vicinity or elsewhere) as domestic or stock water purposes, irrigation, etc.

Earth fill dams of the type mentioned above have been in use especially throughout the semi-arid Western States, and the necessary fundamental principles of design are well known, such as the relationship of base dimension to top dimension for stability, etc. However, these dams have not generally been successful, due primarily to either one of two causes, namely: failure of the bases due to the buoyancy of the water, or failure of the entire structure of the dam, or in some cases, some particular part of it, thereby resulting in subsequent complete failure through the well known solvent action of the water upon the soluble substances incorporated in the material of which the dam is built. Therefore in many cases the gradual infiltration of water impounded behind an earth fill dam of the gravity type has dissolved these soluble substances so that the entire structure is so weakened that it can no longer withstand the pressure of the impounded water. In other cases fissures have opened where soluble material occurred in spots only, thereby gradually weakening the dam until failure resulted.

In the semi-arid States of the West, where the practice of constructing earth fill gravity dams for the purpose of impounding water is most prevalent, almost invariably material available for filling contains a greater or less percentage of soluble substances. At times these substances may run as high as 50% per unit volume; at other times a smaller percentage is present. At any time the presence of solubles constitute a menace.

Filling material taken from stream bottoms usually contain the least percentages of these soluble substances, due to the fact that the action of the water running over such material has dissolved and carried the solubles away. Consequently dams constructed of such material have generally proved more successful. At least, it is safe to say that they do not fail due to dissolution of the solubles incorporated in the fill.

Unfortunately, except in very rare instances, there is seldom sufficient material of this kind present in the dam site with which to construct the entire dam, necessitating the balance be drawn from the banks or other locations where the material has not under gone the washing action of water dissolving the soluble substances therefrom to any marked extent.

Therefore, it is an object of this invention to provide a method whereby an earth filled dam may be constructed in which all of the fill material may be washed in water so that the soluble substances may be dissolved and removed therefrom.

A further object of this invention is to provide a simple and improved method whereby such material may be washed and easily placed at the desired location in building the dam.

A further object of the invention is to provide an improved dam.

Other objects will be apparent from the following description taken in connection with the accompanying drawings, wherein:

Fig. 3 is a vertical section of the dam under construction.

Fig. 4 is a diagrammatic view of apparatus for transporting earth fill material mixed with water over considerable distances.

Figure 1:
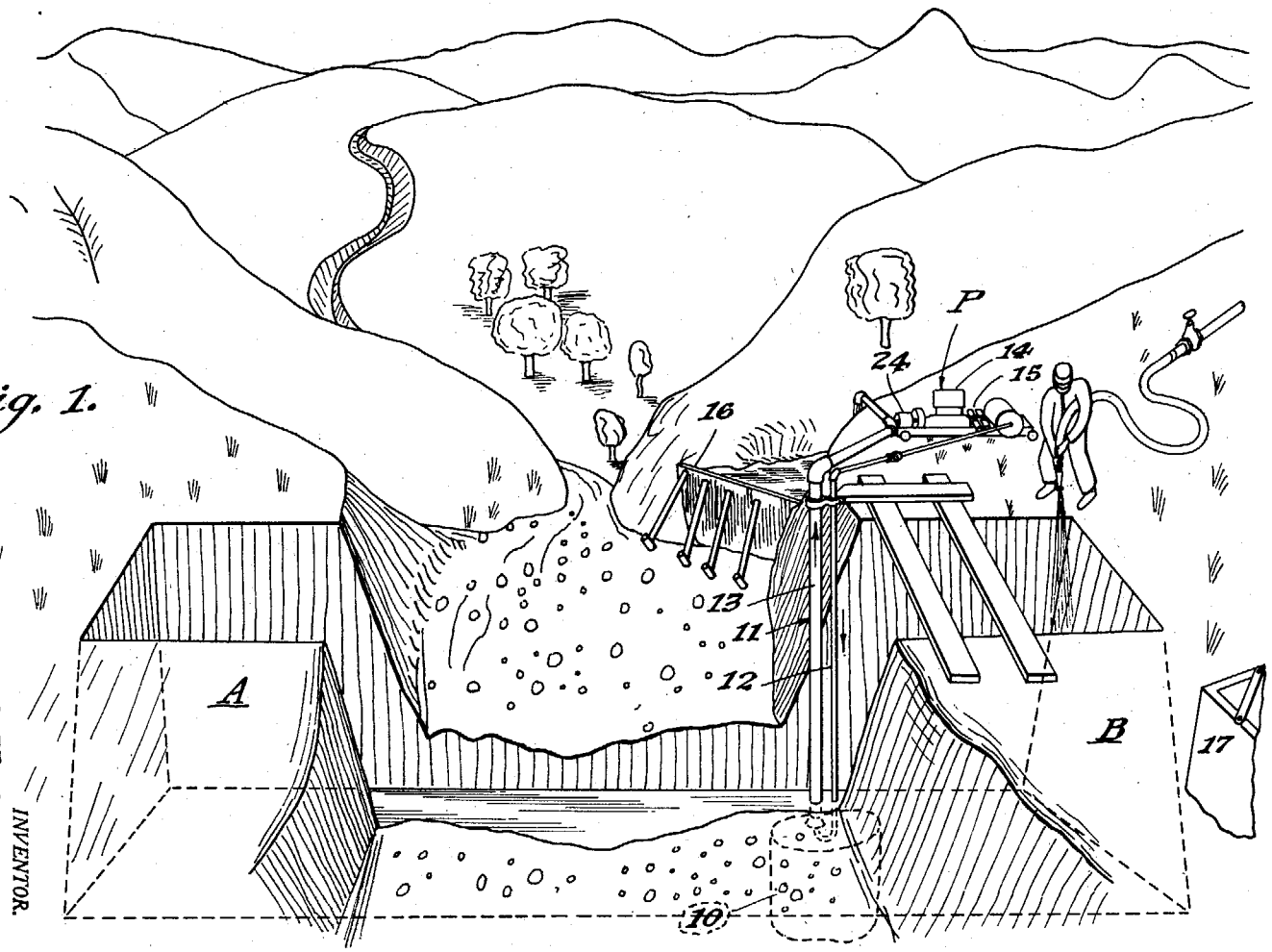
Fig. 1 is a perspective view of a dam site, the view being taken looking up stream and showing the dam in the preliminary stages of construction.

Referring to the drawings by reference characters I have shown a sump 10 which is in the bed of a suitable stream adjacent to the dam site. The first step in constructing the improved dam is to sink the sump 10 until bed rock or a hard impervious layer is encountered. A suitable air lift, generally indicated at 11, is placed in the sump 10, such air lift being provided with a suitable air pipe 12 and a discharge pipe 13.

I provide a suitable power unit generally designated at P, having a suitable source of power such as a gasoline motor or its equivalent designated at 14, which may be used to operate a suitable air compressor 15, supplying compressed air through the air pipe 12 to the lift 11. Water is placed in the sump 10, and the walls A and B of the stream are excavated to provide buttresses for the dam. I preferably perform such excavating by what is known as hydraulicking, as shown in Fig. 1, although this procedure is not absolutely necessary. Where the excavating is done by hydraulicking, the earth from the sides or walls A and B of the stream is washed into the sump 10. If the excavating is performed in some other manner, I merely supply water in the sump 10 and dump the material excavated from the walls A and B into the sump 10 which is kept full of water. The water in the sump 10 together with the material from the sides or walls A and B which is held in suspension, is raised in the discharge pipe 13 and carried to a point preferably up stream from the dam site. As shown in Fig. 1, I provide a temporary structure or dam, indicated at 16, at a point located up stream from the dam site, wherein the material of the water lifted from the sump 10 by the discharge pipe 13 is placed. The excavation provided for the body of the dam is lowered to the depth of the sump 10, or in other words, down to bed rock, or to some equivalent strata.

Figure 2:
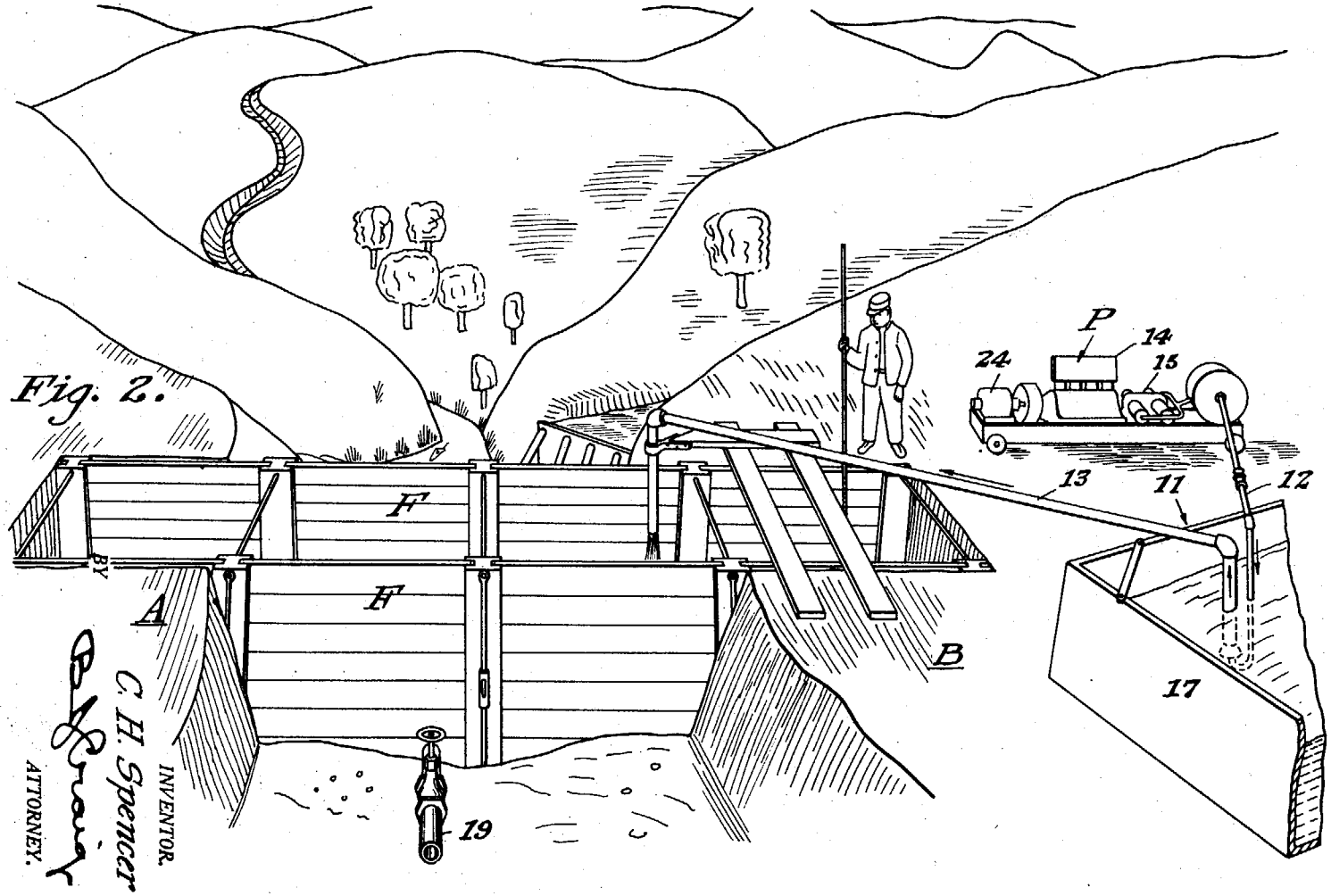
Fig. 2 is a view similar to Fig. 1, the dam being shown in an advanced stage of construction.

Referring now more specifically to Fig. 2, when the excavation for the body of the dam is completed, forms F are placed therein and a suitable basin 17 is provided, preferably upon one of the banks or walls of the stream, herein shown as being upon the bank B, in which clay and water are placed. The air lift 11, which was previously employed, is now used to convey the clay and water from the basin 17 to the bottom of the excavation for the dam. This is to provide a puddled clay bottom 18 on the bottom of the excavation or trench which will cling tenaciously to the foundation, preventing seepage of ground water or under flow, and be heavy enough to counteract the upward thrust due to the buoyant effect of the water. As shown in Fig. 2, a suitable discharge pipe 19 is preferably installed during the erection of the forms F, which discharge pipe 19 extends through the dam and into the reservoir.

Reference now being had to Fig. 3 this view illustrates the method employed for filling the forms above the puddled clay bottom with fill material, from which the soluble substances have been washed. At a point somewhat up stream from the dam, a second sump 20 is provided and is filled with water by any suitable means, it being understood that the water from the stream may be used for this purpose. However, as is the case in the semi-arid Western States, the streams dry up during the summer months during which dam construction may be desirable, water may have to be provided by other sources for the sump 20. Fill material from the bottom of the stream bed is washed into the sump, such material, as has been previously stated, being generally low in percentage of soluble material. That material which was previously excavated in building the trench for the dam and placed behind the temporary dam 16, is also used. In order to wash down the material herein designated at 21, into the sump 20, I provide suitable electric motors 22 having water tight cases adapted to drive propellers 23, which continually circulate the water in the sump 20 and in the stream bed, causing the fill material to be completely washed and settled into the sump in a somewhat finely divided state. The motors 22 which are provided with water tight cases, have their source of power in the power unit P, wherein the gasoline motor 14 may also be used to drive an electric generator 24 connected by suitable cables or conduits 25 to the electric motors 22.

The air lift 11 is removed from the basin 17 and lowered into the sump 20, and the water and fill material settled therein is raised and poured into the dam between the forms F, until the trench is completely filled. It is to be understood that the forms F are not water proof, but are provided with suitable perforations or apertures to allow the water lifted with the fill material through the air lift 11 to escape therethrough, leaving the fill material between the forms F, and carrying with it the soluble substances incorporated in the fill material.

It is to be appreciated that the portion of the discharge pipe 12 below the surface of the water in the sump must be twice as great as the length of the discharge pipe 12 extending above the surface of the water. In other words the actual lift above the surface of the water in the sump is only one-half as great as the submerged portion of the pipe.

It is to be understood that I do not limit myself to the use of water alone for dissolving soluble substances from the fill material. In some cases where the fill material which has incorporated therein substances, such as certain alkalies which are only slightly soluble in water but exceedingly soluble in acids, it may be found desirable to place acid in the water, or salts, giving a decidedly acid reaction which will facilitate dissolving these alkalies.

In other cases, it may be found desirable to introduce dry cement, gypsum, or equivalent binding materials, into the water in the sump, thereby giving a harder and firmer earth structure.

The forms F are allowed to stay in place until the water poured between them has been allowed to completely escape, carrying with it the soluble substance, and the fill material is allowed to shrink and settle. They are then removed and the space which they occupy is filled with earth, preferably, from which the soluble substances have been washed.

Fig. 4 illustrates the method of transporting the water and fill material for considerable distances. A plurality of sumps 30 are provided at convenient distances apart and an air lift 31 is inserted into each sump. Each air lift 31 raises the fill material and water from the sump 30 and conveys it to the next adjacent sump 30. In this manner the water and fill material may not only be carried for considerable horizontal distances, but may be stepped up so that it may be raised to a considerable altitude.

As an alternative means of lifting the mixture of earth and water from the stream bed into the forms or removing the earth and water when excavating the trench, or in transferring the clay and water from the basin 17 into the forms, I may employ a sluicing box having a round bottom, or a pipe in which are rigidly secured propellers at convenient distances apart adapted to lift the water and silt. These propellers are rotated by motors within water tight cases, and when the fill material and water are to be lifted a considerable distance, consecutive propellers may rotate in opposite directions so as to counteract the swirling or corkscrew action of the water. The power used for operating these motors may be derived from the power unit designated by the reference character P upon the drawings.

It is seen that a method is provided wherein an earth structure may be constructed in which the major portion of the soluble matter incorporated in the fill material is removed by washing. The structure is produced by pouring earth mixed with water or a dissolving agent within forms and allowing the water or dissolving agent to drain off, carrying with it the soluble material. Although the method disclosed herein has been illustrated and described in connection with building earth fill dams, it may be employed with equal advantage in constructing other earth structures, such as roads, dikes, railway fills, and the like, wherein it is desirable to have all soluble matter removed from the fill material.

Having thus described my invention, what I claim is:

1. The method of constructing earth fill dams comprising erecting forms across a stream bed, providing a sump in said stream bed, disentegrating the material of said stream bed and impelling it into said sump by impeller means positioned below the surface of the water in said stream, elevating said mixture from said sump and pouring it into said forms and allowing the water to drain off.

2. The method of constructing an earth fill dam which consists of forming a trench across a stream bed, erecting forms in said trench, providing a sump in said stream bed below the surface of said stream bed, mixing earth containing solubles with water in said stream bed, thoroughly agitating said mixture to cause the water to dissolve said solubles and forcibly impelling said mixture into said sump, elevating said mixture out of said sump and poring it into said forms, allowing the water to drain off and the fill material to dry and then removing said forms.

3. The method of constructing an earth filled dam which consists of forming a trench across the stream bed, erecting perforate forms in the trench, providing an impervious bottom in the forms, hydraulicking the material from the adjacent stream bed into the forms on top of the impervious bottom, and allowing the water from the mixtures to drain off through the forms removing with it any solubles which may be in the material.

In testimony whereof, I hereunto affix my signature.

CHARLES H. SPENCER.